US012451590B2

(12) United States Patent
Wang et al.

(10) Patent No.: US 12,451,590 B2
(45) Date of Patent: Oct. 21, 2025

(54) WIRELESS EARSET

(71) Applicant: LUXSHARE PRECISION INDUSTRY COMPANY LIMITED, Shenzhen (CN)

(72) Inventors: Yan Wang, Shenzhen (CN); ZeKui Fu, Shenzhen (CN); JinXiang Liu, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 459 days.

(21) Appl. No.: 17/971,984

(22) Filed: Oct. 24, 2022

(65) Prior Publication Data

US 2023/0137605 A1 May 4, 2023

(30) Foreign Application Priority Data

Oct. 29, 2021 (CN) ......................... 202122634358.8

(51) Int. Cl.

| | |
|---|---|
| ***H01Q 1/22*** | (2006.01) |
| ***H01Q 1/27*** | (2006.01) |
| ***H01Q 9/04*** | (2006.01) |
| ***H01Q 25/00*** | (2006.01) |

(52) U.S. Cl.

CPC ........... *H01Q 1/2291* (2013.01); *H01Q 1/273* (2013.01); *H01Q 9/0407* (2013.01); *H01Q 25/00* (2013.01)

(58) Field of Classification Search

CPC .... H01Q 1/2291; H01Q 1/273; H01Q 9/0407; H01Q 25/00; H01Q 9/42; H01Q 21/28; H01Q 3/24

See application file for complete search history.

(56) References Cited

U.S. PATENT DOCUMENTS

| | | | | |
|---|---|---|---|---|
| 10,944,154 B1 * | 3/2021 | Tong | H01Q 1/243 | |
| 2006/0079275 A1 * | 4/2006 | Ella | H04B 1/006 | 455/552.1 |
| 2013/0109433 A1 * | 5/2013 | Wang | H04B 1/406 | 455/552.1 |

FOREIGN PATENT DOCUMENTS

| | | |
|---|---|---|
| CN | 106331918 A | 1/2017 |
| CN | 111935796 B | 1/2021 |

* cited by examiner

*Primary Examiner* — Zhitong Chen

(74) *Attorney, Agent, or Firm* — Birch, Stewart, Kolasch & Birch, LLP

(57) ABSTRACT

Disclosed is a wireless earset including a housing, and a first antenna, a second antenna, a switching circuit, and a control circuit disposed in the housing. There is an interval between a first position where the first antenna is disposed in the housing and a second position where the second antenna is disposed in the housing. The first antenna and the second antenna generate different radiation patterns. The control circuit controls the switching circuit to electrically connect the first antenna or the second antenna, so that the first antenna and the second antenna transmit a first radio frequency signal output by the control circuit at different times. The control circuit determines a received signal strength of the first antenna and the second antenna, and controls the switching circuit to connect the first antenna or the second antenna with a greater received signal strength to receive a second radio frequency signal.

17 Claims, 6 Drawing Sheets

WIRELESS EARSET

CROSS REFERENCE TO RELATED APPLICATION

This application claims the priority benefit of Chinese Patent Application Serial Number 202122634358.8, filed on Oct. 29, 2021, the full disclosure of which is incorporated herein by reference.

BACKGROUND

Technical Field

The present disclosure relates to the technical field of communication technology, and in particular to a wireless earset or headset.

Related Art

As Bluetooth headsets and earsets become more popular in the market, people's requirements for the appearance design and the function of the Bluetooth headset and earsets becomes higher. In terms of appearance design, the volume must be small enough to be easy to wear. However, the more multi-functional requirements, the more electronic components need to be added, so that the space where the antenna can be installed is squeezed, which limits the design of the antenna, resulting in poor over-the-air (OTA) performance of the antenna and poor radiation pattern of the antenna, which causes a problem of poor user experience.

In addition, with the increasing number of electronic products, such as routers, bracelets, sports watches, and cameras, that work on the 2.4G frequency band, the 2.4G frequency band has become overcrowded. Therefore, the requirements for the anti-interference ability of Bluetooth headset and earsets need to be raised accordingly to avoid affecting the user experience.

SUMMARY

The present disclosure provides a wireless earset, which can effectively solve the problems that the OTA performance and pattern of the antenna existing in the Bluetooth earset are poor and the anti-interference ability needs to be improved.

In order to solve the above technical problem, the present disclosure is implemented as follows.

The present disclosure provides a wireless earset, which includes a housing, a first antenna, a second antenna, a switching circuit, and a control circuit. The first antenna is disposed in a first position in the housing, and the second antenna is disposed in a second position in the housing. There is an interval between the first position and the second position, and the first antenna and the second antenna are configured to generate different radiation patterns. The switching circuit is disposed in the housing and selectively electrically connected to the first antenna or the second antenna. The control circuit is disposed in the housing and electrically connected to the switching circuit, the first antenna, and the second antenna. The control circuit is configured to output a first radio frequency signal and control the switching circuit to switch alternatively to electrically connect the first antenna and the second antenna, so that the first antenna and the second antenna transmit the first radio frequency signal at different times. The control circuit is configured to obtain and determine a received signal strength of the first antenna and the second antenna after the switching circuit electrically connects the first antenna and the second antenna respectively, and control the switching circuit to electrically connect the first antenna or the second antenna, which has a greater received signal strength, to receive a second radio frequency signal.

In the embodiment of the present disclosure, the design of the first antenna and the second antenna that are set in different positions and have different radiation patterns (i.e., the dual antenna design) can solve the problem that the OTA performance and pattern of the antenna existing in the Bluetooth earset are poor. In addition, through the dual antenna design and the procedure of switching alternatively between the first antenna and the second antenna with the switching circuit (that is, the dual-antenna switching technology is adopted), the transmission or reception of radio frequency signals can be realized, the influence of in-band and out-of-band interference in the external environment on the antenna performance can be reduced, and the anti-interference ability is improved, thereby enhancing the user experience.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
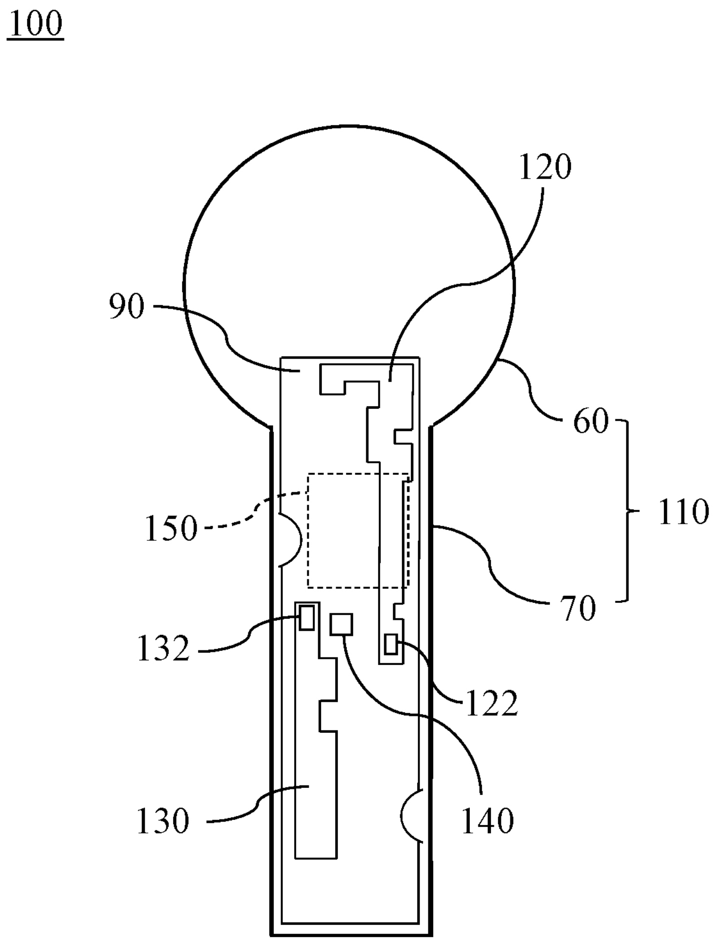
FIG. 1 is a schematic structural diagram of a wireless earset according to an embodiment of the present disclosure.

The present disclosure will now be described more fully hereinafter with reference to the accompanying drawings, in which exemplary embodiments of the disclosure are shown.

This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
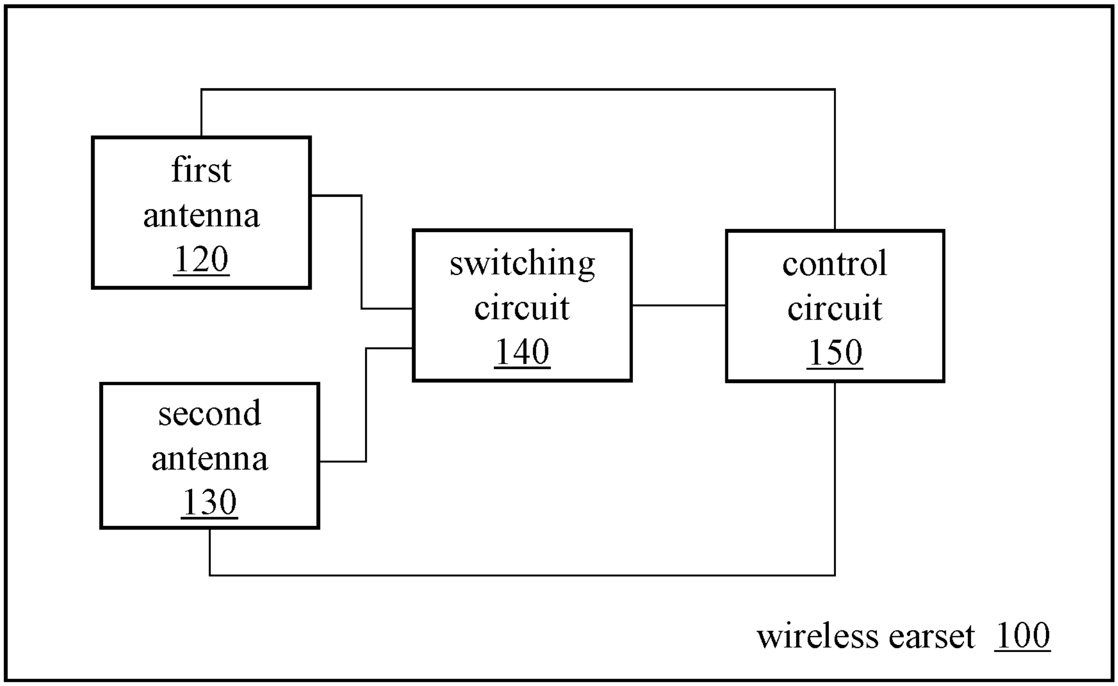
FIG. 2 is a block diagram of a wireless earset according to an embodiment of the present disclosure.

Please refer to FIGS. 1 and 2, wherein FIG. 1 is a schematic structural diagram of a wireless earset according to an embodiment of the present disclosure, and FIG. 2 is a block diagram of a wireless earset according to an embodiment of the present disclosure. As shown in FIGS. 1 and 2, in this embodiment, the wireless earset 100 comprises a housing 110, a first antenna 120, a second antenna 130, a switching circuit 140, and a control circuit 150. The first antenna 120, the second antenna 130, the switching circuit 140 and the control circuit 150 are disposed in the housing 110, the switching circuit 140 is selectively electrically connected to the first antenna 120 or the second antenna 130, and the control circuit 150 is electrically connected to the switching circuit 140, the first antenna 120 and the second antenna 130.

In actual implementation, the wireless earset 100 may be, but not limited to, a true wireless stereo (TWS) earset or a TWS headset; each of the first antenna 120 and the second antenna 130 may be, but not limited to, a monopole antenna, an inverted F-shaped antenna (IFA), a ceramic antenna, a printed circuit board (PCB) antenna, a flexible printed circuit (FPC) antenna, a steel-sheet antenna or a laser direct structuring (LDS) antenna; each of the switching circuit 140 and the control circuit 150 can be, but are not limited to, an analog circuit, an integrated circuit (IC), a digital circuit or other devices to achieve their functions, wherein the integrated circuit can be, for example, a microprocessor, a microcontroller (MCU), a programmable logic gate array (e.g., FPGA and CPLD) or an application specified integrated circuit (ASIC), the analog circuit may include multiple electronic components, and the electronic components are the components required by the TWS earset or the TWS headset.

In this embodiment, the first antenna 120 is disposed in a first position in the housing 110, the second antenna 130 is disposed in a second position in the housing 110, and there is an interval between the first position and the second position. The first antenna 120 and the second antenna 130 are configured to generate different radiation patterns.

In an example, the wireless earset 100 may be an earphone with a long handle, and the housing 110 may comprise an ear plug portion 60 and an ear handle portion 70. The first position is located on one side of the ear handle portion 70 close to the ear plug portion 60. The second position is located on one side of the ear handle portion 70 away from the ear plug portion 60, as shown in FIG. 1. By the interval between the first position and the second position, the isolation between the first antenna 120 and the second antenna 130 is increased.

Figure 3:
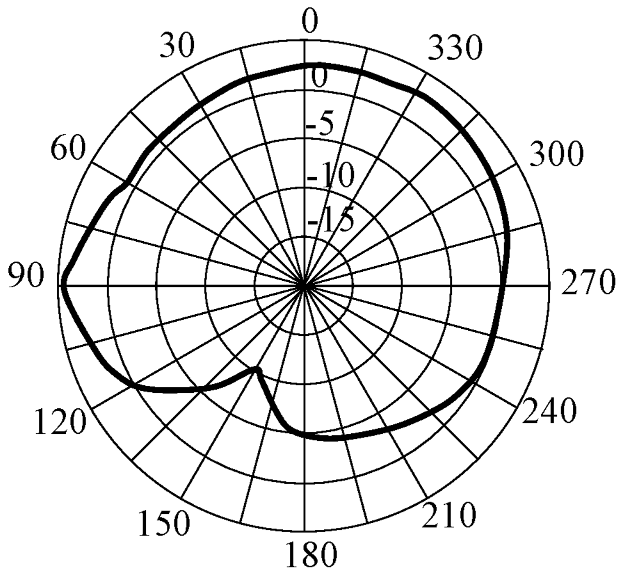
FIG. 3 is a horizontal radiation pattern of an embodiment of the first antenna of FIG. 1.
Figure 4:
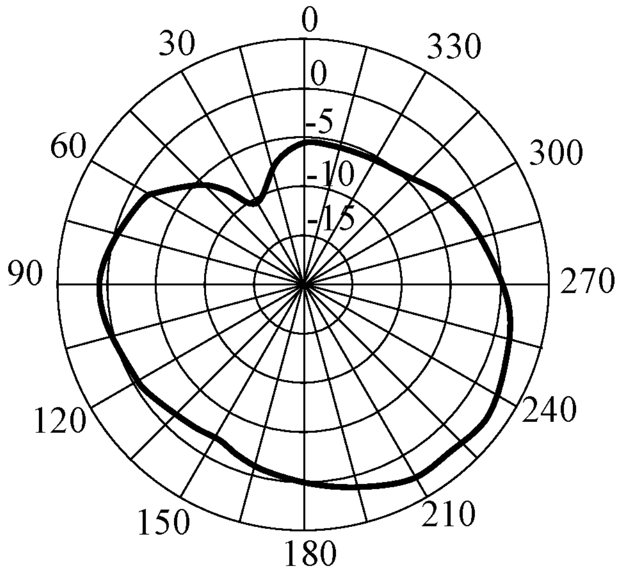
FIG. 4 is a horizontal radiation pattern of an embodiment of the second antenna of FIG. 1.

In an example, please refer to FIGS. 3 and 4, wherein FIG. 3 is a horizontal radiation pattern of an embodiment of the first antenna of FIG. 1, and FIG. 4 is a horizontal radiation pattern of an embodiment of the second antenna of FIG. 1. Specifically, FIG. 3 is a horizontal radiation pattern of the total radiated power (TRP) of the 39th channel of the first antenna 120, and FIG. 4 is a horizontal radiation pattern of the TRP of the 39th channel of the second antenna 130. It can be seen from FIG. 3 that the radiation of the first antenna 120 in the 150-degree area is relatively weak, where the signal strength is about −10 dB, which is the signal blind area of the first antenna 120. It can be seen from FIG. 4 that the signal strength of the second antenna 130 in the 150-degree area is about −1 dB. Therefore, the signal strength of the second antenna 130 in the 150-degree area can complement with that of the signal blind area of the first antenna 120. Similarly, the signal strength of the first antenna 120 in the 30-degree area can complement with that of the signal blind area of the second antenna 130. It can be seen that FIGS. 3 and 4 can be combined to obtain a relatively complete radiation pattern (that is, the radiation pattern provided by the first antenna 120 and the radiation pattern provided by the second antenna 130 are complementary), which can enhance the anti-interference ability of the wireless earset 100 and is the advantage that the traditional Bluetooth earset with only a single antenna does not have. It should be noted that the appearance of the actual wireless earset 100 (that is, the shape of the housing 110) and the radiation patterns and configuration positions of the first antenna 120 and the second antenna 130 can be adjusted according to actual needs, and the radiation patterns provided by the first antenna 120 and the second antenna 130 can be adjusted according to the shapes or antenna types of the first antenna 120 and the second antenna 130.

In this embodiment, the control circuit 150 is configured to output the first radio frequency signal, and controls the switching circuit 140 to switch alternatively to electrically connect the first antenna 120 and the second antenna 130, so that the first antenna 120 and the second antenna 130 transmit the first radio frequency signal at different times. In more detail, when the wireless earset 100 needs to transmit the first radio frequency signal to an external electronic device, the wireless earset 100 can output the first radio frequency signal through the control circuit 150, and cooperate with the switching circuit 140 to switch alternatively to electrically connect the first antenna 120 and the second antenna 130 within nanoseconds, so that the first antenna 120 and the second antenna 130 transmit the first radio frequency signal at different times, and the radiation patterns provided by the first antenna 120 and the second antenna 130 are complementary. Therefore, the omni-directional transmission of the first radio frequency signal can be improved, the signal blind area of the wireless earset 100 can be reduced, and the communication quality between the wireless earset 100 and the external electronic device can be improved. The first radio frequency signal output by the control circuit 150 may include, but is not limited to, the user's voice signal received by the microphone not drawn of the wireless earset 100.

In this embodiment, the control circuit 150 is configured to obtain and determine a received signal strength (e.g., received signal strength indicator, RSSI) of received signals of the first antenna 120 and the second antenna 130 after the switching circuit 140 electrically connects the first antenna 120 and the second antenna 130 respectively, and control the switching circuit 140 to electrically connect the first antenna 120 or the second antenna 130 with a greater received signal strength (e.g., greater RSSI) to receive a second radio frequency signal. In more detail, the greater RSSI of the antenna, the closer the distance between the antenna and the external electronic device; therefore, when the wireless earset 100 needs to receive the second radio frequency signal from the external electronic device, it can determine the distance between the first antenna 120 and the external electronic device according to the RSSI of the first antenna 120, and the distance between the second antenna 130 and the external electronic device according to the RSSI of the second antenna 130, and can receive the second radio frequency signal by electrically connecting the switching circuit 140 to the antenna with a greater RSSI (for example, the first antenna 120 or the second antenna 130), thereby improving the communication quality between the wireless earset 100 and the external electronic device. It should be noted that the switching time for the switching circuit 140 to be electrically connected to the first antenna 120 and the second antenna 130 may be, but not limited to, in nanoseconds. The second radio frequency signal received by the control circuit 150 may include, but is not limited to, an audio signal from the external electronic device, and the control circuit 150 may transmit the received second radio frequency signal to the speaker not shown of the wireless earset 100 to play.

In an embodiment, the wireless earset 100 may further comprise a main board 90 disposed in the housing 110. The control circuit 150, the switching circuit 140, the first antenna 120 and the second antenna 130 are disposed on the main board 90. The control circuit 150 is disposed on one surface of the main board 90, and the switching circuit 140, the first antenna 120 and the second antenna 130 are disposed on another surface of the main board 90. The main board 90 may be, but is not limited to, a printed circuit board. Therefore, the connection lines between the control circuit 150 and the switching circuit 140, the connection lines between the switching circuit 140 and the first antenna 120, the connection lines between the switching circuit 140 and the second antenna 130, the connection lines between the control circuit 150 and the first antenna 120, and the connection lines between the control circuit 150 and the second antenna 130 can be hidden in the wiring configuration of the main board 90.

In an embodiment, referring to FIGS. 1 and 2, the first antenna 120 may be provided with a first feeding point 122 electrically connected to the switching circuit 140, and the first feeding point 122 is configured to feed the first radio frequency signal. The second antenna 130 may be provided with a second feeding point 132, which is electrically connected to the switching circuit 140, and the second feeding point 132 is configured to feed the first radio frequency signal.

In an embodiment, the area of the ground plate can affect the gain value applied to the radio frequency signal transmission and reception. Since the space in which the first antenna 120 and the second antenna 130 can be installed in the wireless earset 100 is limited, the design of the ground plane of the first antenna 120 and the second antenna 130 may be limited, so that there is a problem that the first antenna 120 and the second antenna 130 cannot have better performance due to the gain values applied to the radio frequency signal transmission and reception. Therefore, the gain values applied to the radio frequency signal transmission and reception of the first antenna 120 and the second antenna 130 can be increased by means of parasitic coupling, and the bandwidths of the first antenna 120 and the second antenna 130 can be increased. The realization method can be put into practice by using the control circuit 150 to control the switching circuit 140 to electrically connect the first antenna 120 and ground the second antenna 130; or using the control circuit 150 to control the switching circuit 140 to electrically connect the second antenna 130 and ground the first antenna 120. In more detail, since the first antenna 120 and the second antenna 130 can not work at the same time, the control circuit 150 can control the switching circuit 140 to ground the antenna not working (i.e., the first antenna 120 or the second antenna 130), so that the area of the ground plate of the working antenna can be increased, and the radiation efficiency of the working antenna can be improved.

Figure 5:
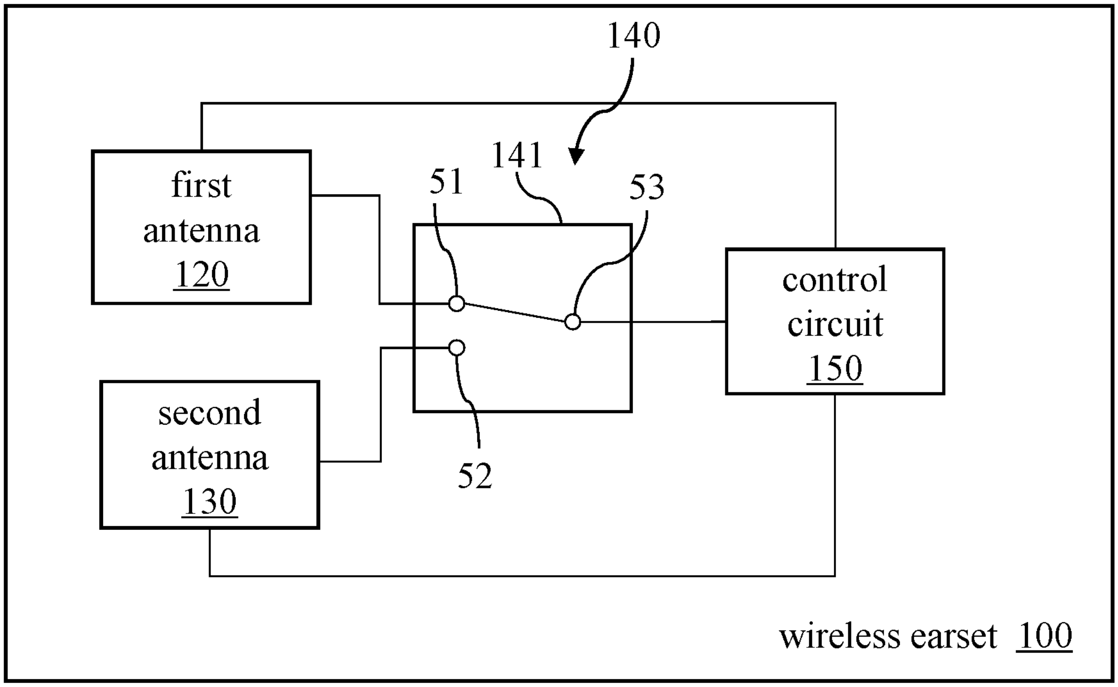
FIG. 5 is a schematic circuit diagram of a wireless earset according to a first embodiment of the present disclosure.

In one embodiment, please refer to FIG. 5, which is a schematic circuit diagram of a wireless earset according to a first embodiment of the present disclosure. As shown in FIG. 5, the switching circuit 140 may comprise a single-pole double-throw switch 141. The single-pole double-throw switch 141 comprises a first terminal 51, a second terminal 52, and a third terminal 53, the first terminal 51 is connected to the third terminal 53 or the second terminal 52 is connected to the third terminal 53, the third terminal 53 is electrically connected to the control circuit 150, the first terminal 51 is electrically connected to the first antenna 120, and the second terminal 52 is electrically connected to the second antenna 130.

Figure 6:
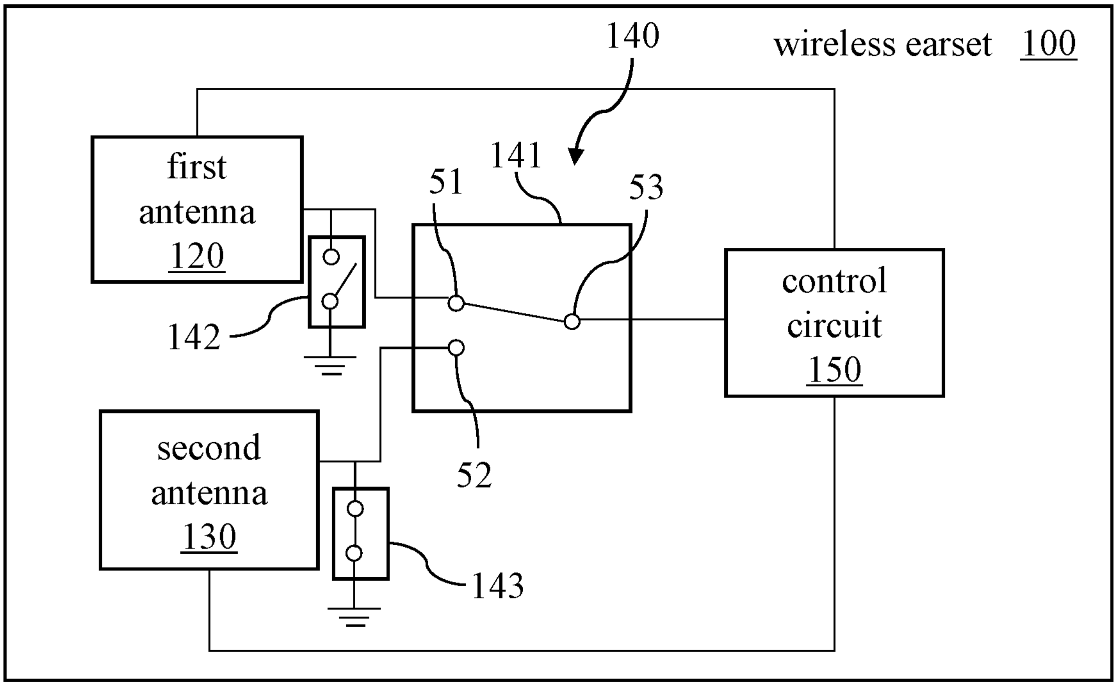
FIG. 6 is a schematic circuit diagram of a wireless earset according to a second embodiment of the present disclosure.

In another embodiment, please refer to FIG. 6, which is a schematic circuit diagram of a wireless earset according to a second embodiment of the present disclosure. As shown in FIG. 6, in addition to the single-pole double-throw switch 141, the switching circuit 140 may further comprise a first switch 142 and a second switch 143. The first terminal 51 is further electrically connected to one end of the first switch 142, and the second terminal 52 is further electrically connected to one end of the second switch 143, and the other end of the first switch 142 and the other end of the second switch 143 are grounded. In order to realize that the control circuit 150 is configured to control the switching circuit 140 to ground the second antenna 130 when controlling the switching circuit 140 to be electrically connected to the first antenna 120, the control circuit 150 turns on and grounds the second switch 143, and turns off the first switch 142 when it controls the first terminal 51 to connect the third terminal 53. In order to realize that the control circuit 150 is configured to control the switching circuit 140 to ground the first antenna 120 when controlling the switching circuit 140 to be electrically connected to the second antenna 130, the control circuit 150 turns off the second switch 143, and turns on and grounds the first switch 142 when it controls the second terminal 52 to connect the third terminal 53.

Figure 7:
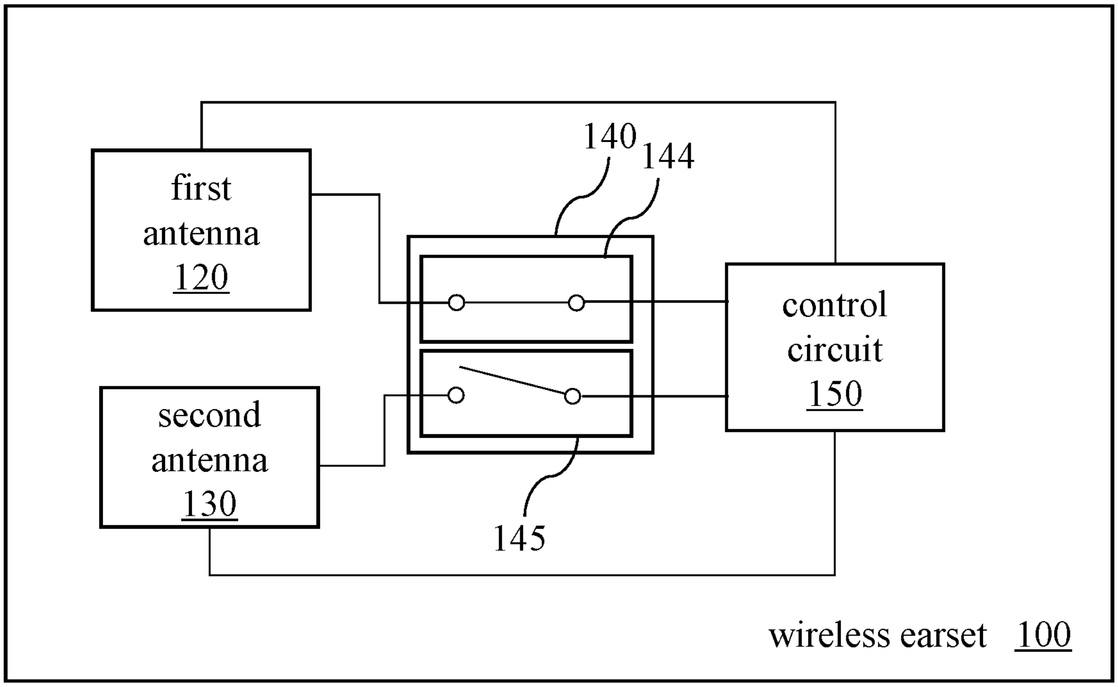
FIG. 7 is a schematic circuit diagram of a wireless earset according to a third embodiment of the present disclosure.

In one embodiment, please refer to FIG. 7, which is a schematic circuit diagram of a wireless earset according to a third embodiment of the present disclosure. As shown in FIG. 7, the switching circuit 140 may comprise a third switch 144 and a fourth switch 145. One end of the third switch 144 and one end of the fourth switch 145 are electrically connected to the control circuit 150, the other end of the third switch 144 is electrically connected to the first antenna 120, and the other end of the fourth switch 145 is electrically connected to the second antenna 130. When the control circuit 150 turns on the third switch 144, it also turns off the fourth switch 145. When the control circuit 150 turns on the fourth switch 145, it also turns off the third switch 144.

Figure 8:
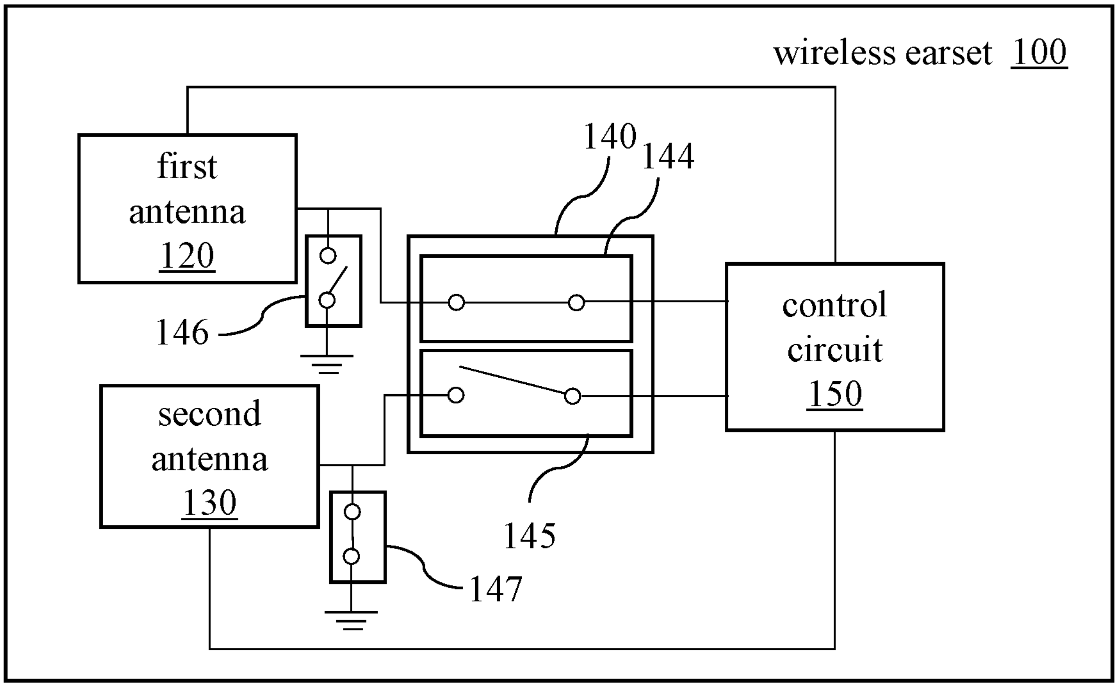
FIG. 8 is a schematic circuit diagram of a wireless earset according to a fourth embodiment of the present disclosure.

In another embodiment, please refer to FIG. 8, which is a schematic circuit diagram of a wireless earset according to a fourth embodiment of the present disclosure. As shown in FIG. 8, in addition to the third switch 144 and the fourth switch 145, the switching circuit 140 may further comprise a fifth switch 146 and a sixth switch 147. The other end of the third switch 144 is further electrically connected to one end of the fifth switch 146. The other end of the fourth switch 145 is further electrically connected to one end of the sixth switch 147, and the other end of the fifth switch 146 and the other end of the sixth switch 147 are grounded. In order to realize that the control circuit 150 is configured to control the switching circuit 140 to ground the second antenna 130 when controlling the switching circuit 140 to be electrically connected to the first antenna 120, the control circuit 150 turns off the fifth switch 146 and turns on and grounds the sixth switch 147 when it turns on the third switch 144 and turns off the fourth switch 145. In order to realize that the control circuit 150 is configured to control the switching circuit 140 to ground the first antenna 120 when controlling the switching circuit 140 to be electrically connected to the second antenna 130, the control circuit 150 turns on and grounds the fifth switch 146 and turns off the sixth switch 147 when it turns off the third switch 144 and turns on the fourth switch 145.

In an embodiment, the switching circuit 140 may comprise a radio frequency switch chip. The radio frequency switch chip may be, but is not limited to, an integrated circuit including the single-pole double-throw switch 141, the first switch 142, and the second switch 143, or an integrated circuit including the third switch 144, the fourth switch 145, the fifth switch 146, and the sixth switch 147.

Figure 9:
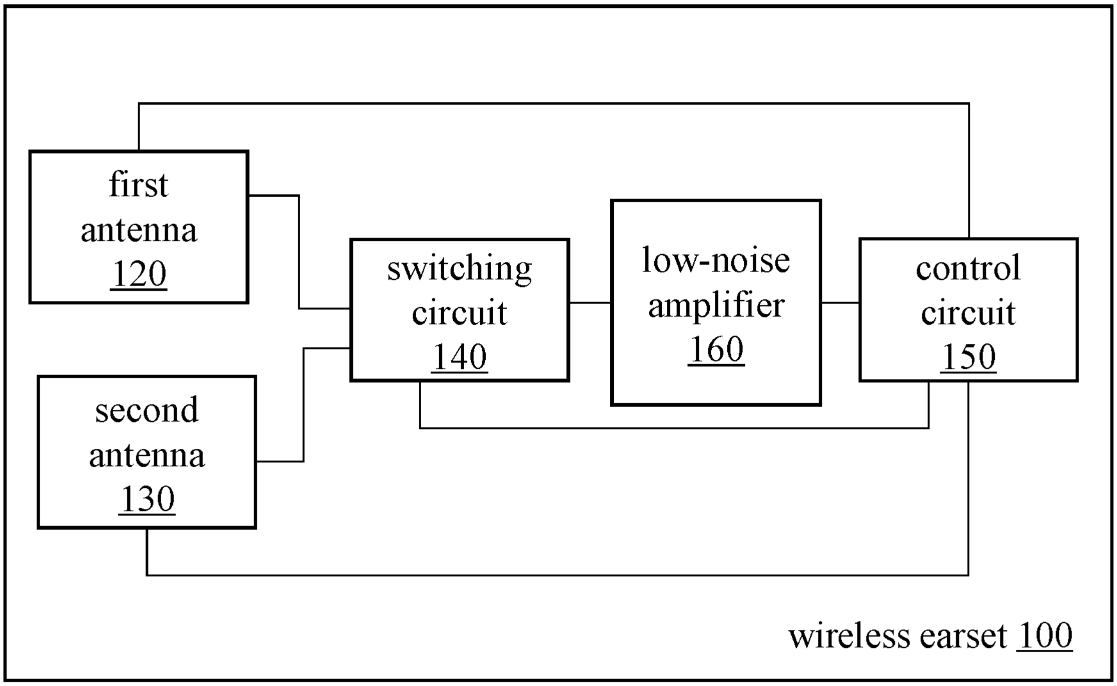
FIG. 9 is a block diagram of a wireless earset according to another embodiment of the present disclosure.

In an embodiment, please refer to FIG. 9, which is a block diagram of a wireless earset according to another embodiment of the present disclosure. As shown in FIG. 9, the wireless earset 100 may further comprise a low-noise amplifier 160, which is disposed in the housing 110 and is electrically connected between the control circuit 150 and the switching circuit 140. The low-noise amplifier 160 is configured to amplify the first radio frequency signal, and the switching circuit 140 is configured to transmit the amplified first radio frequency signal to the first antenna 120 and the second antenna 130. The switching circuit 140 is configured to receive the second radio frequency signal through the first antenna 120 or the second antenna 130, and the low-noise amplifier 160 is configured to amplify the received second radio frequency signal and then transmit it to the control circuit 150. The low-noise amplifier 160 has a good noise figure, which can amplify the first radio frequency signal and the second radio frequency signal while having a better suppression effect on low noise, so as to provide the beautiful sound quality.

Figure 10:
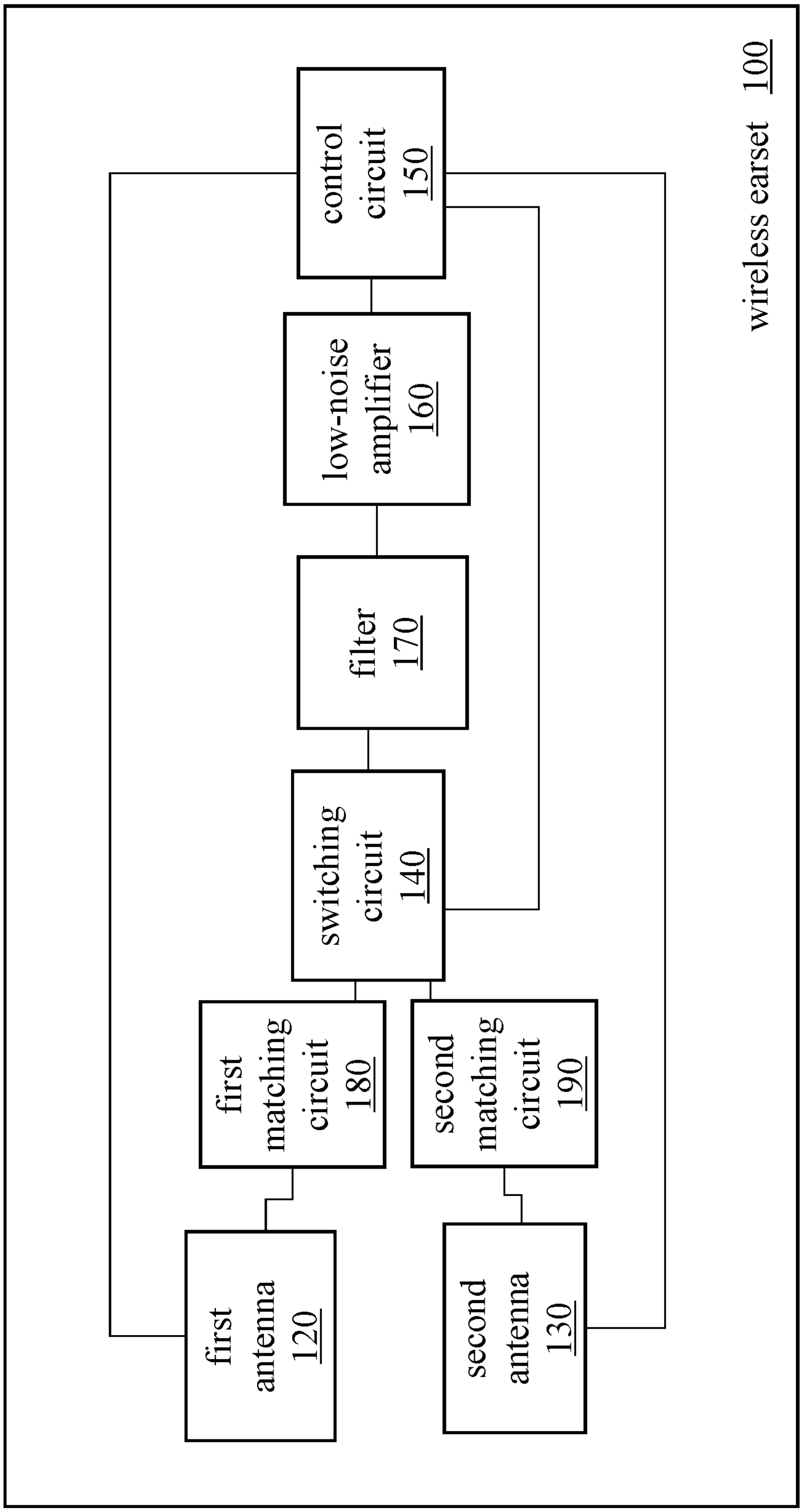
FIG. 10 is a block diagram of a wireless earset according to another embodiment of the present disclosure.

In an embodiment, please refer to FIG. 10, which is a block diagram of a wireless earset according to another embodiment of the present disclosure. As shown in FIG. 10, in addition to the low-noise amplifier 160, the wireless earset 100 may further comprise a filter 170, which is disposed in the housing 110 and is electrically connected between the low-noise amplifier 160 and the switching circuit 140. The filter 170 is configured to filter the first radio frequency signal amplified by the low-noise amplifier 160, and the switching circuit 140 is configured to transmit the filtered first radio frequency signal to the first antenna 120 and the second antenna 130. The switching circuit 140 is configured to receive the second radio frequency signal through the first antenna 120 or the second antenna 130, the filter 170 is configured to filter the second radio frequency signal, and the low-noise amplifier 160 is configured to amplify the filtered second radio frequency signal, and then transmit it to the control circuit 150.

In an embodiment, referring to FIG. 10, the wireless earset 100 may further comprise a first matching circuit 180 and a second matching circuit 190, which are disposed in the housing 110. The first matching circuit 180 is electrically connected between the first antenna 120 and the switching circuit 140, and the second matching circuit 190 is electrically connected between the second antenna 130 and the switching circuit 140. Therefore, the impedance matching of the first antenna 120 and the second antenna 130 is improved by the setting of the first matching circuit 180 and the second matching circuit 190.

In summary, the wireless earset or headset of the embodiment of the present disclosure can solve the problem that the OTA performance and pattern of the antenna existing in the Bluetooth earset or headset are poor by the design of the first antenna and the second antenna that are set in different positions and have different radiation patterns (i.e., the dual antenna design), which can enhance the anti-interference ability of the wireless earset or headset. In addition, through the dual antenna design and the procedure of switching alternatively between the first antenna and the second antenna with the switching circuit (that is, the dual-antenna switching technology is adopted), the transmission or reception of radio frequency signals can be realized, the influence of in-band and out-of-band interference in the external environment on the antenna performance can be reduced, and the anti-interference ability is improved, thereby enhancing the user experience. Moreover, the switching circuit is controlled by the control circuit to ground the antenna not working, which increases the area of the ground plate of the working antenna and improves the radiation efficiency of the working antenna.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A wireless earset, comprising:

a housing;

a first antenna disposed in a first position in the housing;

a second antenna disposed in a second position in the housing, wherein there is an interval between the first position and the second position, and the first antenna and the second antenna are configured to generate different radiation patterns;

a switching circuit disposed in the housing and selectively electrically connected to the first antenna or the second antenna; and a control circuit disposed in the housing and electrically connected to the switching circuit, the first antenna, and the second antenna, wherein the control circuit is configured to output a first radio frequency signal and control the switching circuit to switch alternatively to electrically connect the first antenna and the second antenna, so that the first antenna and the second antenna transmit the first radio frequency signal at different times, and the control circuit is configured to obtain and determine a received signal strength of the first antenna and the second antenna after the switching circuit electrically connects the first antenna and the second antenna respectively, and control the switching circuit to electrically connect the first antenna or the second antenna, which has a greater received signal strength, to receive a second radio frequency signal;

wherein the control circuit is configured to control the switching circuit to ground the second antenna when controlling the switching circuit to be electrically connected to the first antenna to increase an area of a ground plate corresponding to the first antenna by incorporating the second antenna into the ground plate; or the control circuit is configured to control the switching circuit to ground the first antenna when controlling the switching circuit to be electrically connected to the second antenna to increase an area of a ground plate corresponding to the second antenna by incorporating the first antenna into the ground plate.

2. The wireless earset according to claim 1, further comprising a low-noise amplifier, wherein the low-noise amplifier is disposed in the housing and is electrically connected between the control circuit and the switching circuit, wherein the low-noise amplifier is configured to amplify the first radio frequency signal; the switching circuit is configured to transmit the first radio frequency signal, which is amplified, to the first antenna and the second antenna; the switching circuit is configured to receive the second radio frequency signal through the first antenna or the second antenna; and the low-noise amplifier is configured to amplify the second radio frequency signal, which is received, and then transmit the amplified second radio frequency signal to the control circuit.

3. The wireless earset according to claim 2, further comprising a filter, wherein the filter is disposed in the housing and is electrically connected between the low-noise amplifier and the switching circuit, wherein the filter is configured to filter the first radio frequency signal amplified by the low-noise amplifier; the switching circuit is configured to transmit the first radio frequency signal, which is filtered, to the first antenna and the second antenna; the switching circuit is configured to receive the second radio frequency signal through the first antenna or the second antenna; the filter is configured to filter the second radio frequency signal; and the low-noise amplifier is configured to amplify the second radio frequency signal, which is filtered, and then transmit the amplified and filtered second radio frequency signal to the control circuit.

4. The wireless earset according to claim 1, wherein the first antenna is provided with a first feeding point, which is electrically connected to the switching circuit, the first feeding point is configured to feed the first radio frequency signal, the second antenna is provided with a second feeding point, which is electrically connected to the switching circuit, and the second feeding point is configured to feed the first radio frequency signal.

5. The wireless earset according to claim 1, further comprising a main board, which is disposed in the housing, wherein the control circuit, the switching circuit, the first antenna and the second antenna are disposed on the main board.

6. The wireless earset according to claim 1, further comprising a first matching circuit and a second matching circuit, which are disposed in the housing, wherein the first matching circuit is electrically connected between the first antenna and the switching circuit, and the second matching circuit is electrically connected between the second antenna and the switching circuit.

7. The wireless earset according to claim 1, wherein the housing comprises an ear plug portion and an ear handle portion, the first position is located on one side of the ear handle portion close to the ear plug portion, and the second position is located on one side of the ear handle portion away from the ear plug portion.

8. The wireless earset according to claim 1, wherein the switching circuit comprises a radio frequency switch chip.

9. The wireless earset according to claim 1, wherein the switching circuit comprises a single-pole double-throw switch, the single-pole double-throw switch comprises a first terminal, a second terminal, and a third terminal, the first terminal is connected to the third terminal or the second terminal is connected to the third terminal, the third terminal is electrically connected to the control circuit, the first terminal is electrically connected to the first antenna, and the second terminal is electrically connected to the second antenna.

10. The wireless earset according to claim 9, wherein the switching circuit further comprises a first switch and a second switch, the first terminal is further electrically connected to one end of the first switch, the second terminal is further electrically connected to one end of the second switch, an another end of the first switch and an another end of the second switch are grounded.

11. The wireless earset according to claim 1, wherein the switching circuit comprises a third switch and a fourth switch, one end of the third switch and one end of the fourth switch are electrically connected to the control circuit, an another end of the third switch is electrically connected to the first antenna, and an another end of the fourth switch is electrically connected to the second antenna.

12. The wireless earset according to claim 11, wherein the switching circuit further comprises a fifth switch and a sixth switch, the another end of the third switch is further electrically connected to one end of the fifth switch, the another end of the fourth switch is further electrically connected to one end of the sixth switch, and an another end of the fifth switch and an another end of the sixth switch are grounded.

13. The wireless earset according to claim 1, further comprising a low-noise amplifier and a main board, wherein the low-noise amplifier is disposed in the housing and is electrically connected between the control circuit and the switching circuit, the low-noise amplifier is configured to amplify the first radio frequency signal; the switching circuit is configured to transmit the first radio frequency signal, which is amplified, to the first antenna and the second antenna; the switching circuit is configured to receive the second radio frequency signal through the first antenna or the second antenna; the low-noise amplifier is configured to amplify the second radio frequency signal, which is received, and then transmit the amplified second radio frequency signal to the control circuit; the main board is disposed in the housing; and the control circuit, the switching circuit, the first antenna and the second antenna are disposed on the main board.

14. The wireless earset according to claim 13, further comprising a filter, wherein the filter is disposed in the housing and is electrically connected between the low-noise amplifier and the switching circuit, wherein the filter is configured to filter the first radio frequency signal amplified by the low-noise amplifier; the switching circuit is configured to transmit the first radio frequency signal, which is filtered, to the first antenna and the second antenna; the switching circuit is configured to receive the second radio frequency signal through the first antenna or the second antenna; the filter is configured to filter the second radio frequency signal; and the low-noise amplifier is configured to amplify the second radio frequency signal, which is filtered, and then transmit the amplified and filtered second radio frequency signal to the control circuit.

15. The wireless earset according to claim 1, wherein the first antenna is provided with a first feeding point, which is electrically connected to the switching circuit, the first feeding point is configured to feed the first radio frequency signal, the second antenna is provided with a second feeding point, which is electrically connected to the switching circuit, and the second feeding point is configured to feed the first radio frequency signal; and the housing comprises an ear plug portion and an ear handle portion, the first position is located on one side of the ear handle portion close to the ear plug portion, and the second position is located on one side of the ear handle portion away from the ear plug portion.

16. The wireless earset according to claim 1, further comprising a low-noise amplifier, a first matching circuit and a second matching circuit, wherein the low-noise amplifier is disposed in the housing and is electrically connected between the control circuit and the switching circuit, the low-noise amplifier is configured to amplify the first radio frequency signal; the switching circuit is configured to transmit the first radio frequency signal, which is amplified, to the first antenna and the second antenna; the switching circuit is configured to receive the second radio frequency signal through the first antenna or the second antenna; the low-noise amplifier is configured to amplify the second radio frequency signal, which is received, and then transmit the amplified second radio frequency signal to the control circuit; the first matching circuit and the second matching circuit are disposed in the housing; the first matching circuit is electrically connected between the first antenna and the switching circuit; and the second matching circuit is electrically connected between the second antenna and the switching circuit.

17. The wireless earset according to claim 16, further comprising a filter, wherein the filter is disposed in the housing and is electrically connected between the low-noise amplifier and the switching circuit, wherein the filter is configured to filter the first radio frequency signal amplified by the low-noise amplifier; the switching circuit is configured to transmit the first radio frequency signal, which is filtered, to the first antenna and the second antenna; the switching circuit is configured to receive the second radio frequency signal through the first antenna or the second antenna; the filter is configured to filter the second radio frequency signal; and the low-noise amplifier is configured to amplify the second radio frequency signal, which is filtered, and then transmit the amplified and filtered second radio frequency signal to the control circuit.

* * * * *